United States Patent
Sobczyk

(10) Patent No.: US 10,105,774 B2
(45) Date of Patent: Oct. 23, 2018

(54) METHOD FOR INCORPORATING UNDERCUTS IN TOOTH FLANKS OF TEETH OF TOOTHED WHEELS

(71) Applicant: Profilator GmbH & Co. KG, Wuppertal (DE)

(72) Inventor: Marcel Sobczyk, Solingen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 32 days.

(21) Appl. No.: 15/319,056

(22) PCT Filed: Mar. 18, 2015

(86) PCT No.: PCT/EP2015/055661
§ 371 (c)(1),
(2) Date: Dec. 15, 2016

(87) PCT Pub. No.: WO2015/192979
PCT Pub. Date: Dec. 23, 2015

(65) Prior Publication Data
US 2017/0113289 A1     Apr. 27, 2017

(30) Foreign Application Priority Data

Jun. 16, 2014   (DE) .................. 10 2014 108 438

(51) Int. Cl.
*B23F 5/16*     (2006.01)
*B23F 19/00*    (2006.01)

(52) U.S. Cl.
CPC .............. *B23F 19/002* (2013.01); *B23F 5/16* (2013.01); *B23F 5/163* (2013.01); *Y10T 409/105565* (2015.01)

(58) Field of Classification Search
CPC ........ B23F 19/002; B23F 19/007; B23F 5/16; B23F 5/163; Y10T 409/105565; Y10T 409/105724; Y10T 409/105883
IPC .......................................................... B23F 5/16
See application file for complete search history.

(56) References Cited

U.S. PATENT DOCUMENTS 9,120,165 B2 *   9/2015   Marx ................... B23F 5/163
2016/0167145 A1 *   6/2016   Vogel ................... B23F 5/163
                                                        409/36

FOREIGN PATENT DOCUMENTS

DE       2603826 B1 *   6/1977   ............. B23F 5/166
DE       3915976 A1     11/1990
DE       4122460 C1     4/1992
(Continued)

OTHER PUBLICATIONS

EPO machine translation of DE 2603826, printed Mar. 2018.*
(Continued)

*Primary Examiner* — Daniel Howell
(74) *Attorney, Agent, or Firm* — Whitmyer IP Group LLC

(57) ABSTRACT

A machine tool and method for incorporating undercuts in left and right tooth flanks of teeth of a toothed gear blank by hob peeling, wherein the gear blank and a cutting wheel having cutting teeth with right and left cutting edges arranged at an axis intersection angle to the gear blank are continuously rotationally driven at a fixed speed ratio, the cutting teeth engage in the tooth flanks in a manner that removes shavings and the feed has at least one movement component in the direction of extension of the teeth of the gear blank.

28 Claims, 5 Drawing Sheets

(56) References Cited

FOREIGN PATENT DOCUMENTS

DE 4200418 C1 12/1992
WO 2007045610 A1 4/2007

OTHER PUBLICATIONS

EPO machine translation of DE 4122460, printed Mar. 2018.*
International Preliminary Report on Patentability and Written Opinion Application No. PCT/EP2015/055661 Completed: May 19, 2015; dated May 29, 2015 11 Pages.
International Search Report (translation) Application No. PCT/EP2015/055661 Completed: May 19, 2015; dated May 29, 2015 3 Pages.

* cited by examiner

METHOD FOR INCORPORATING UNDERCUTS IN TOOTH FLANKS OF TEETH OF TOOTHED WHEELS

TECHNICAL FIELD

The invention relates to a method for incorporating undercuts in left and right tooth flanks of teeth of a toothed gear blank by hob peeling, wherein the gear blank and a cutting wheel having cutting teeth with right and left cutting edges arranged at an axis intersection angle to the gear blank are continuously rotationally driven at a fixed speed ratio, the cutting teeth engage in the tooth flanks in a manner that removes shavings and the feed has at least one movement component in the direction of extension of the teeth of the gear blank.

BACKGROUND

DE 41 22 460 C1 discloses such a method. The two tooth edges of the toothed cutting wheel engage in the tooth gaps of the teeth of the gear blank to be provided with undercuts, wherein the feed has a movement component in the axial direction of the gear blank and in the radial direction of the gear blank. Both tooth flanks are simultaneously provided with undercuts. The method is only suitable for straight-toothed workpieces.

DE 42 00 418 C1 describes a method for producing undercuts with only one radial feed.

DE 39 15 976 C2 describes a method for finish machining of the flanks of straight- or sloping-toothed, internal or external toothed gear wheels by hob peeling, in which the axial distance and the phase position of the rotational movement of the tool with respect to the rotational movement of the workpiece are continuously varied and in which the right or left flanks are produced in separate work processes.

With the method mentioned initially and the tools used there, only straight-toothed toothed structures can be provided with undercuts. Such toothed structures are found, for example, on the sliding sleeves in automobile manual transmissions. In heavy goods vehicles sloping toothed gear wheels are frequently used. With the method mentioned initially it is not possible to introduce undercuts into sloping toothed gear blanks.

SUMMARY

The invention is therefore based on the object of expanding the spectrum of application of the method.

The object is solved by the invention specified in the claims. Initially and substantially it is proposed that during incorporation of the undercuts, the cutting teeth do not engage with both cutting edges simultaneously into the opposite tooth flanks of a tooth gap. On the contrary, it is provided that the undercuts are incorporated in two consecutive machining steps, wherein in each case preferably one undercut flank running obliquely to the tooth flanks is produced which extends tooth-inwards. The undercut flank is adjoined by an exit flank which has an axial length which is considerably shorter than the axial length of the undercut flank. In a first machining step during a feed which has a movement component in the axial direction and a differential feed component, one of the two teeth flanks of the teeth are machined in each case with one of the two cutting edges. The differential feed is achieved by a change in the phase position of the axes of the workpiece and the tool rotating in a fixed speed ratio to one another. Workpiece and tool thereby make a relative rotation in one direction of rotation. As a result of a continuous increase in the phase shift, the depth of entry of the cutting edge into the respective tooth flanks increases accompanying the axial shift of the cutting edge. The other cutting edge runs freely through the tooth gap. In a second machining step a differential feed component in the opposite direction of rotation is superposed on the axial feed component. Here also the phase position between the rotational movement of the workpiece axis and the rotational movement of the tool axis varies continuously with the axial feed so that the other cutting edge dips increasingly deeper into the respective other tooth flanks accompanying the axial shift of the tool. In the second machining step one tooth flank runs freely through the tooth gap. A comparable result can be achieved by superposing a tangential feed component relative to the tooth engagement point in the anticlockwise direction of rotation or clockwise direction of rotation on the axial feed component, i.e. the feed component in the direction of extension of the tooth flank. The workpiece axis of rotation and the tooth engagement point at which the cutting tooth of the cutting wheel engages in a cutting manner in the tooth flank of the gear blank spans a plane. This plane is intersected by the tool axis at an axis intersection angle. The point through which the tool axis goes through this plane lies in a line lying in the plane which runs transversely to the workpiece axis and goes through the tooth engagement point. During variation of the feed in the tangential direction, the point of intersection of the tool axis migrates perpendicularly in the plane of rotation of the gear blank to a radial direction. For correction of distortions in the undercut flanks, during the feed in the tooth flank direction of extension, the axis intersection angle or the radial distance of the point of intersection of the tool spindle axis in the plane of rotation of the gear blank can be varied. The cutting machining to produce the undercuts can, for example, begin with the machining of the left or right tooth flanks. Then in this case, only the left or right cutting edges are initially used. If for example machining begins with the left tooth flank, in this first machining phase only the left cutting edges of the cutting wheel are in cutting engagement in the left tooth flank whereas the right cutting edges dip freely through the gap. The differential feed is accomplished here by a relative rotation in the anticlockwise direction. Preferably the machining of the right tooth flank only takes place after the undercutting of the left tooth flank is completed. In this machining phase the right cutting edge engages in a cutting manner in the right tooth flank of the tooth of the gear blank. The relative feed is accomplished by a relative rotation in the anticlockwise direction.

With the method not only straight-toothed gear wheels and not only internally toothed but also externally toothed gear wheels are provided with undercuts. It is therefore in particular possible to incorporate undercuts in the tooth flanks of the teeth of helically toothed workpieces by means of an individual differential feed component in the anticlockwise direction of rotation or clockwise direction of rotation. In the case of straight-toothed gear blanks the two differential feed components are symmetrical. In the case of helically toothed gear wheels, the two differential feed components differ from one another so that asymmetrical undercuts can be produced. The transition region between the undercut flank and the non-undercut section of a tooth flank is formed by a sloping exit flank. The axial length of the undercut flank which runs obliquely inwards at an undercut angle to the tooth flank is greater than, preferably more than twice as great as the exit flank which runs at an exit angle obliquely to the tooth flank. The undercut angle lies in a range between 2.5° to 17°, preferably between 4° and 15°. The exit angle is preferably greater than 15°. During the machining of the undercuts, the cutting edge cuts more deeply into the tooth flank with increasing feed in the axial direction or tooth extension direction until a maximum cutting-in depth is reached. On reaching the maximum cutting-in depth, the axial feed is stopped. The tool is then moved out from the toothed structure or the undercut. This can be accomplished in the radial direction. However it is also possible for this purpose to vary the angle of twist between tooth spindle and workpiece spindle or to move the tool out from the undercut by a combination of these movements. An exit flank substantially dependent on the axis intersection angle then remains. As a result of this configuration, in a gear wheel undercut according to the invention which is installed in a transmission, only a minimal axial region of the tooth flank is not available as a supporting surface for action of a mating tooth flank of a mating gear wheel. First tooth flanks of a first mating gear wheel can act on the undercut flanks and the tooth flanks of a second mating gear wheel can act on the non-undercut sections of the tooth flanks. Preferably a cutting wheel with a relatively small diameter compared with the diameter of the gear blank is used. The ratio of the teeth of the cutting wheel to the teeth of the gear blank is preferably in a range of less than a half, less than a third, less than a quarter or approximately a fifth. In an exemplary embodiment the gear blank has 77 teeth and the cutting wheel 16 teeth. The cutting wheel can be a resharpenable tool or a non-resharpenable tool. The cutting edges can lie in a common surface, for example a plane surface or a cone surface. The cutting wheel then has a disk grinding. However it can also be provided that the cutting wheel has a step cut. The tip clearance angle of the cutting edge preferably lies in a range of 6° to 15°. The flank clearance angle of the cutting edge of the cutting wheel is at least as large as the undercut angle, preferably 2° larger in each case than the undercut angle. It can lie, for example, in the range of 6 to 17°. Such a preferred cutting wheel is preferably not resharpenable but has the advantage of being able to fabricate exit flanks with a small axial extension. Other process variants are also possible. During the cutting machining with the axial feed and the differential feed, additional feed components are possible. A conical root circle can be produced with a radial feed. It is further possible to simultaneously shift the axis intersection angle or the position of the axis intersection point of tool spindle axis and workpiece spindle axis. It is in particular provided to use each of these degrees of freedom individually or in combination for varying the feed.

The invention furthermore relates to a machine tool with a tool spindle for receiving a tool and a workpiece spindle for receiving a workpiece, wherein tool spindle and workpiece spindle can be driven by individual drives synchronized with one another. Electric drives can further be provided with which the axial feed can be achieved. The individual drives are driven by the control device by means of a control program. The control program is adapted so that the machine tool performs the method described above.

BRIEF DESCRIPTION OF THE DRAWINGS

An exemplary embodiment of the invention is explained hereinafter with reference to appended drawings. In the figures.

DETAIL DESCRIPTION

Figure 7:
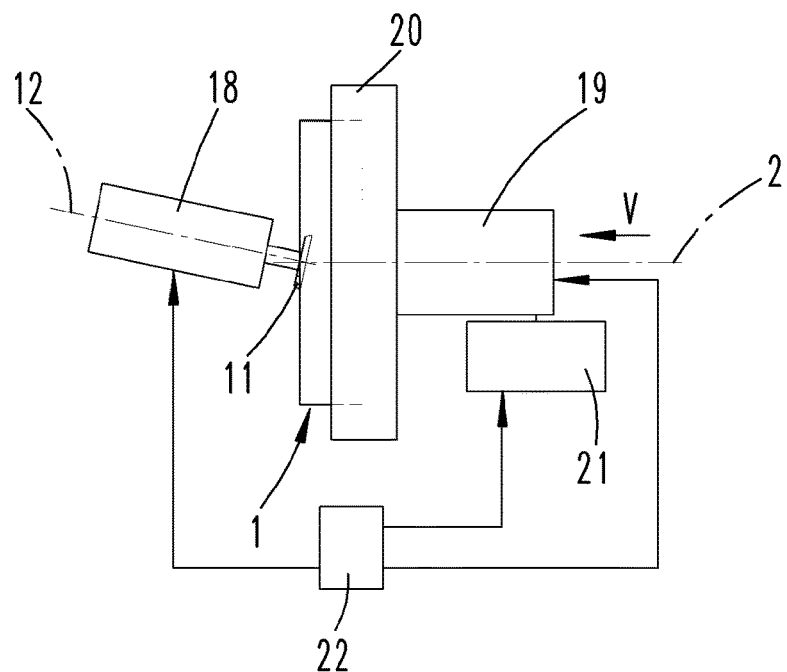

The machine tool which is shown schematically in FIG. 7 has a machine bed not shown with positioning drives which can be controlled by a control device 22 for positioning the location of a tool spindle 18 with respect to a workpiece spindle 19. FIG. 7 shows the tool spindle 18 which comprises an electrical single drive which is controlled by the control device 22. The tool spindle drives a cutting wheel 11 which rotates about the tool spindle axis 12. The workpiece spindle 19 is rotationally driven by an electrical single drive about an axis of rotation 2 and has a chuck 20 in which a toothed gear blank 1 to be provided with undercuts is clamped. A feed device 21 is provided by means of which a feed V can be achieved in the axial direction of the workpiece spindle axis 2. The feed V has a movement component in axial direction 2 of the gear blank 1. With the control device 22, gear blank 1 and cutting wheel 11 are driven synchronized with respect to one another in a predefined speed ratio, which corresponds to the tooth ratio of gear blank 1 and cutting wheel 11. In addition, the control device 22 is able to change the phase position of the rotation of workpiece spindle 19 and tool spindle 18 according to a control program in order to implement a differential feed. The differential feed can be accomplished both in the anticlockwise direction of rotation L and also in the clockwise direction of rotation R. For the machining of helically toothed workpieces the phase position additionally depends on the depth of penetration of the cutting wheel 11 in the gear blank 1.

The control device 22 has a control program which is programmed in such a manner that the method described hereinafter, which comprises an exemplary embodiment of the invention, can be carried out on the machine tool.

Figure 3:
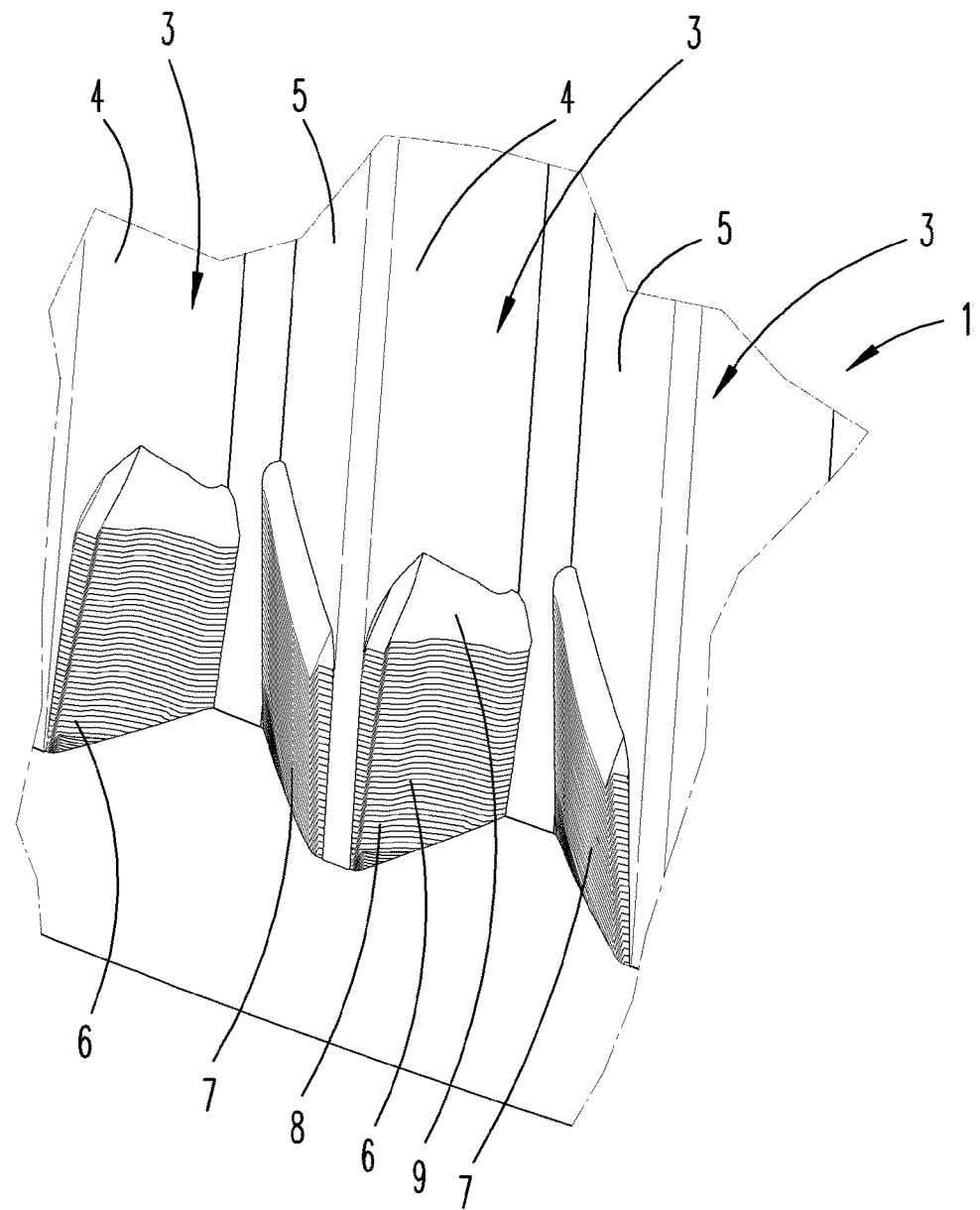
FIG. 3 shows an enlarged front view of the undercuts 6 produced by the method in tooth flanks 4, 5 of the teeth 3 of a gear blank 1.
Figure 4:
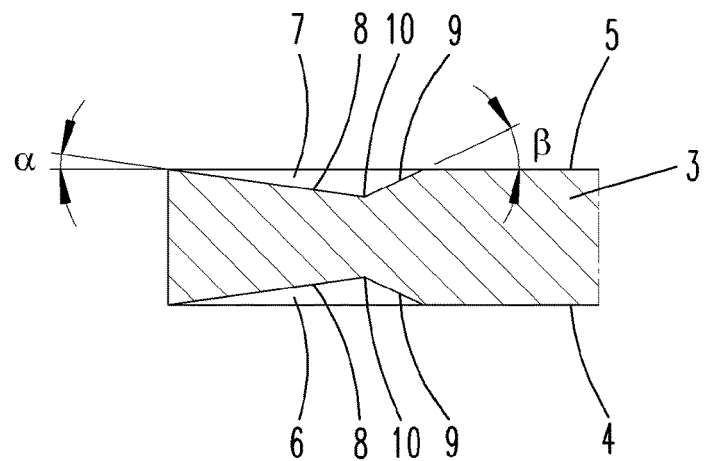
FIG. 4 shows a section through a tooth 3 in the region of the undercut 6 to illustrate the flank profile of the undercut flank 7 and the exit flank 9.
Figure 5:
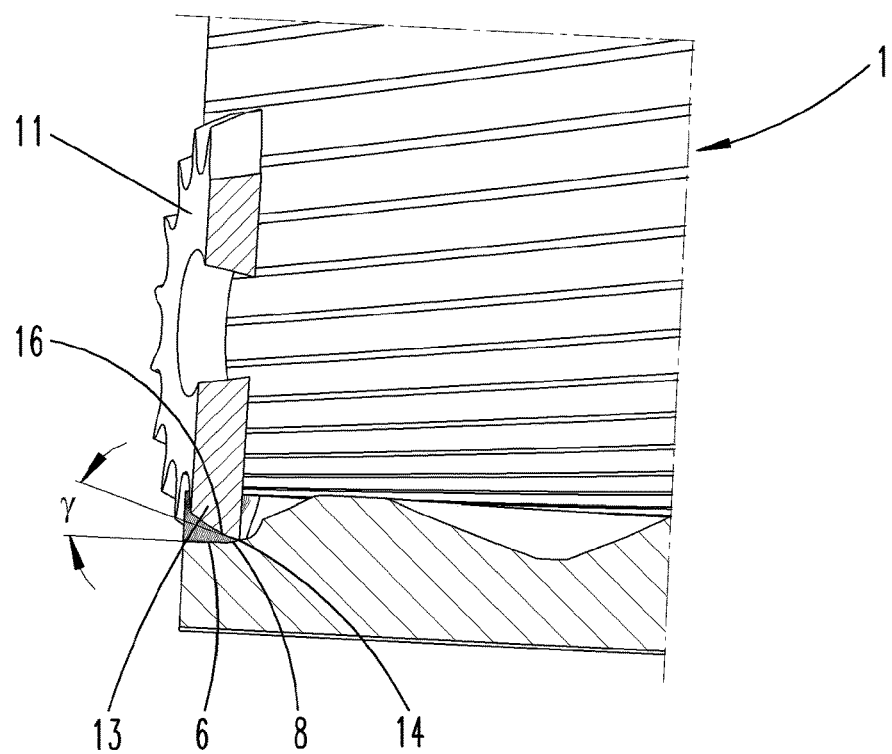
FIG. 5 shows a section along the line V-V in FIG. 2 to illustrate the tip clearance angle γ which lies in the range of 6° to 15°.
Figure 6:
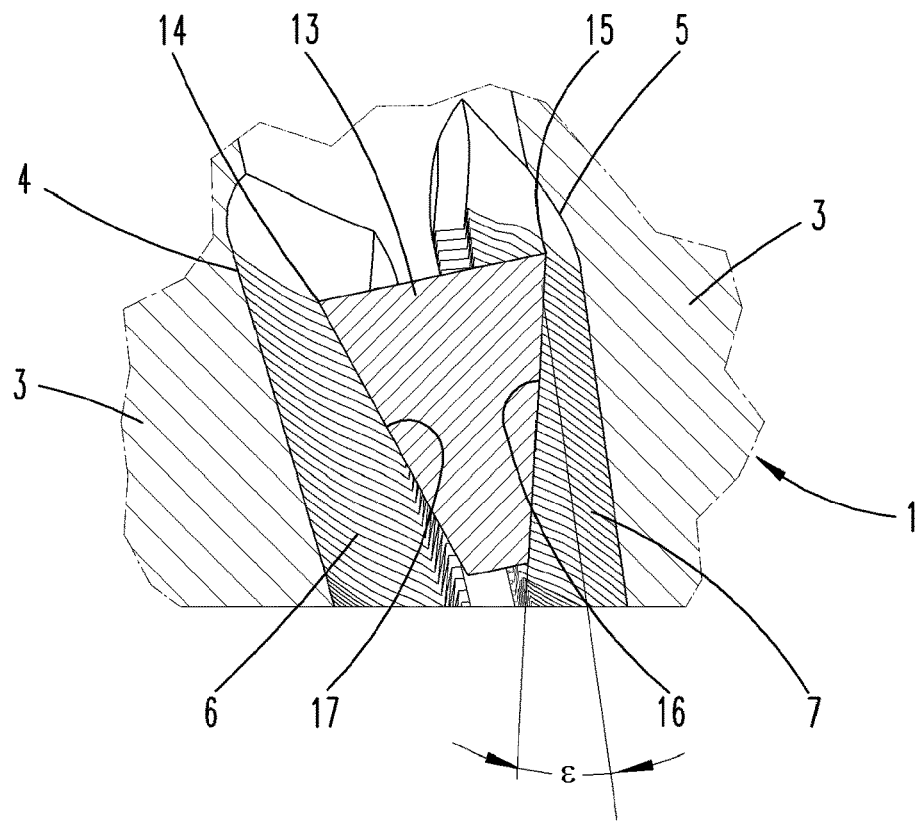
FIG. 6 shows a section along the line VI-VI in FIG. 2 to illustrate the flank clearance angle c which can lie in the range between 6° to 17°, and FIG. 7 schematically shows the structure of a machine tool.

The undercuts shown in FIGS. 3 and 4 are to be produced with the method. These comprise recesses in the tooth flanks 4, 5 of the teeth 3 of a pre-toothed internally toothed gear blank 1. The teeth 3 of the gear blank 1 have tooth flanks 4, 5. Thus, left tooth flanks 4 and right tooth flanks 5 point towards a tooth gap arranged between two teeth 3. Left undercuts 6 are to be incorporated in the left tooth flanks 4 and right undercuts 7 are to be incorporated in the right tooth flanks 5. The geometrical shape of the undercuts is shown in FIGS. 3 and 4. Both the left undercuts 6 and the right undercuts 7 each have undercut flanks 8 running to the left tooth flank 4 or the right tooth flank 5 at an undercut angle α which lies in a range between 2.5° to 17°, preferably in a range between 6° to 17°. The undercut flanks 8 have their greatest penetration depth into the left tooth flank 4 or the right tooth flank 5 in the region of a transition 10. In the tooth-inward direction, the transition 10 is adjoined by an exit flank 9 which is a maximum of half as long as the undercut flank 8. The exit flank 9 has an exit flank angle of more than 15° to the tooth flank 4, 5. The lines running transversely to the direction of extension of the undercuts 6, which can be seen in FIGS. 3 and 6, symbolize the individual consecutive cuts of left and right cutting edges 14, 15 of the cutting teeth 13 of a cutting wheel 11.

The cutting wheel 11 has a plane front face. However the front face can also run conically or in a step-shaped manner. The front face in respectively one cutting tooth 13 adjoins a left cutting edge 14 or a right cutting edge 15. Left flanks 16 or right flanks 17 adjoin the cutting edges 14, 15. The flank angle c of the flank 16 or 17 which corresponds to a flank clearance angle during cutting lies in the range between 6 and 17° and should be at least 2° greater than the undercut angle α. The tip angle γ in the range of the line of intersection of the cutting edges 16, 17 is 6 to 15°.

In the exemplary embodiment, the inner toothed structure serves as a hollow wheel for receiving a planetary transmission. The planetary gears roll in a rolling manner on the helical inner toothed structure. In the exemplary embodiment the inner toothed structure is a helical toothed structure. However, the toothed structure can also be straight. This comprises a running toothed structure with a greater tooth height and a smaller angle of engagement than a normal coupling toothed structure. The tooth height corresponds to approximately twice the modulus. The undercuts cooperate with tooth flanks of an externally toothed mating gear which rotates coaxially to the internally toothed gear wheel. The two toothed structures are brought into and out of engagement by axial displacement.

A feed in the radial direction is possible in order to produce a conical root circle. It is further provided to change the axis intersection angle θ during fabrication of the undercuts 6 and/or to vary the position of the tool spindle axis 12 and the workpiece spindle axis 2. It is in particular provided to influence the tooth flanks 4, 5 by a combination of varying individual ones or all the fabrication parameters during production of the undercuts 6.

The method for producing the undercuts is carried out in the following steps:

Firstly in a hob peeling movement in each case only one tooth flank of the teeth 3 of the gear blank 1 is provided with undercuts. In the exemplary embodiment this is the right flank 5. To this end the tool spindle axis 12 is brought into an axis intersection angle θ to the workpiece spindle axis 2. The cutting wheel 11 is brought into a position in which the right cutting edge 15 abuts against the right tooth flank 5 of a tooth 3. The tool spindle 18 and the workpiece spindle 19 are then brought into a synchronized rotation. This is followed by a continuous feed in the form of a relative displacement of the cutting wheel 11 with respect to the gear blank 1 which has a movement component in the direction of extension of the teeth 3. In the case of a helically toothed gear blank as shown in the exemplary embodiment, the feed therefore has a component in the axial direction of the workpiece spindle axis 2 and a component in the direction of rotation, i.e. the phase position between workpiece spindle rotation and tool spindle rotation varies continuously.

A differential feed in the clockwise direction of rotation R is superposed on this feed which would merely result in a displacement of the cutting edges 14, 15 along the tooth flanks 4, 5. This differential feed in the clockwise direction has the result that the right cutting edge 15 enters into the right tooth flank 5 in order to cut out the undercut flank 8 from the material of the tooth 3. After reaching the transition 10 the axial feed is stopped and the tool is moved radially out of the toothed structure. As a result of the axis intersection angle θ, an exit flank 9 remains. In the case of a straight-toothed blank the basic feed takes place in the axial direction of the gear blank 2. The differential feed is superposed on this basic feed.

Figure 1:
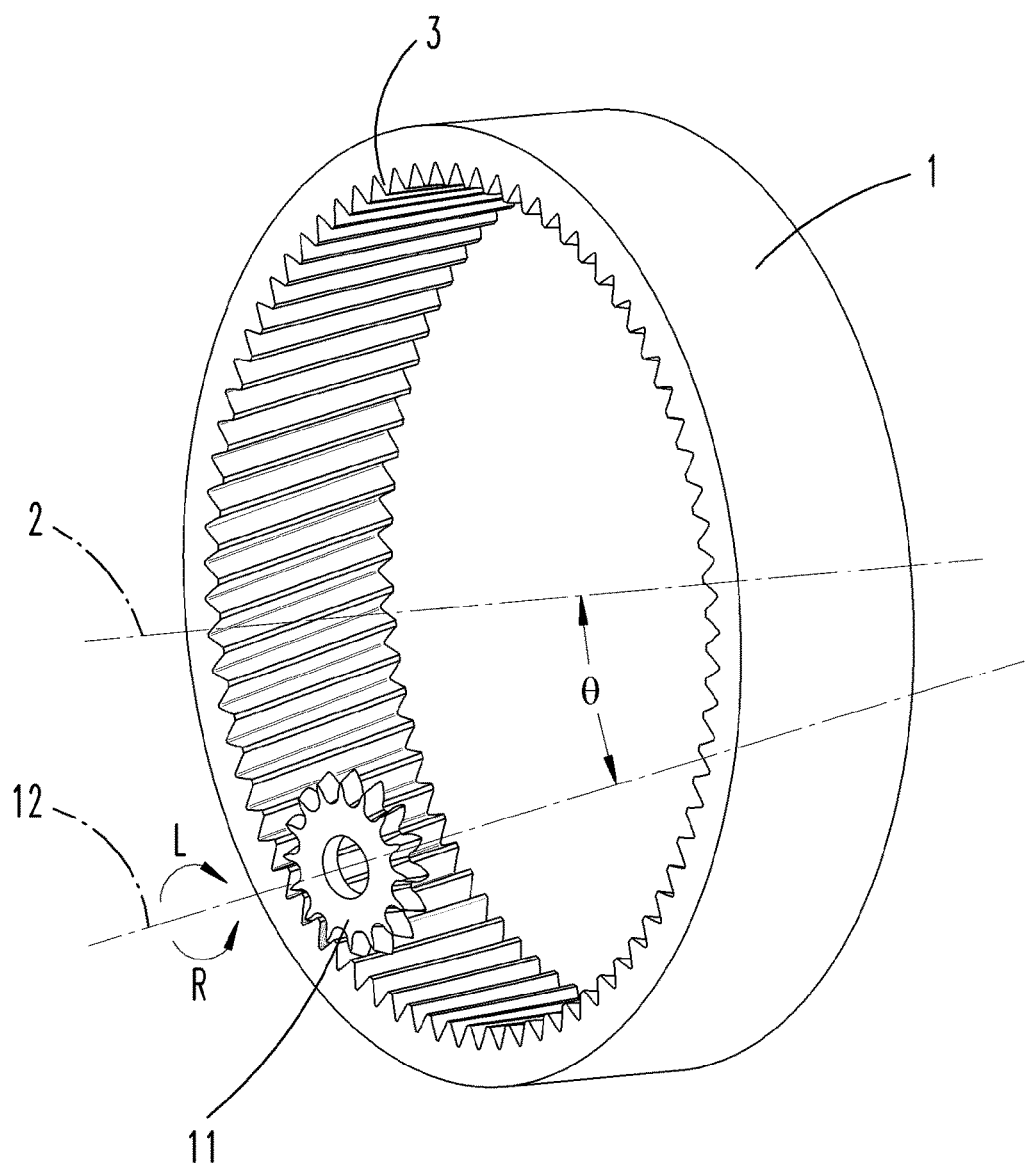
FIG. 1 shows to illustrate the spatial position of gear blank 1 and cutting wheel 11 a gear blank 1 held by a chuck 20 of a machine tool shown schematically in FIG. 7 and a cutting wheel 11 sitting on a tool spindle 18 in a perspective view.
Figure 2:
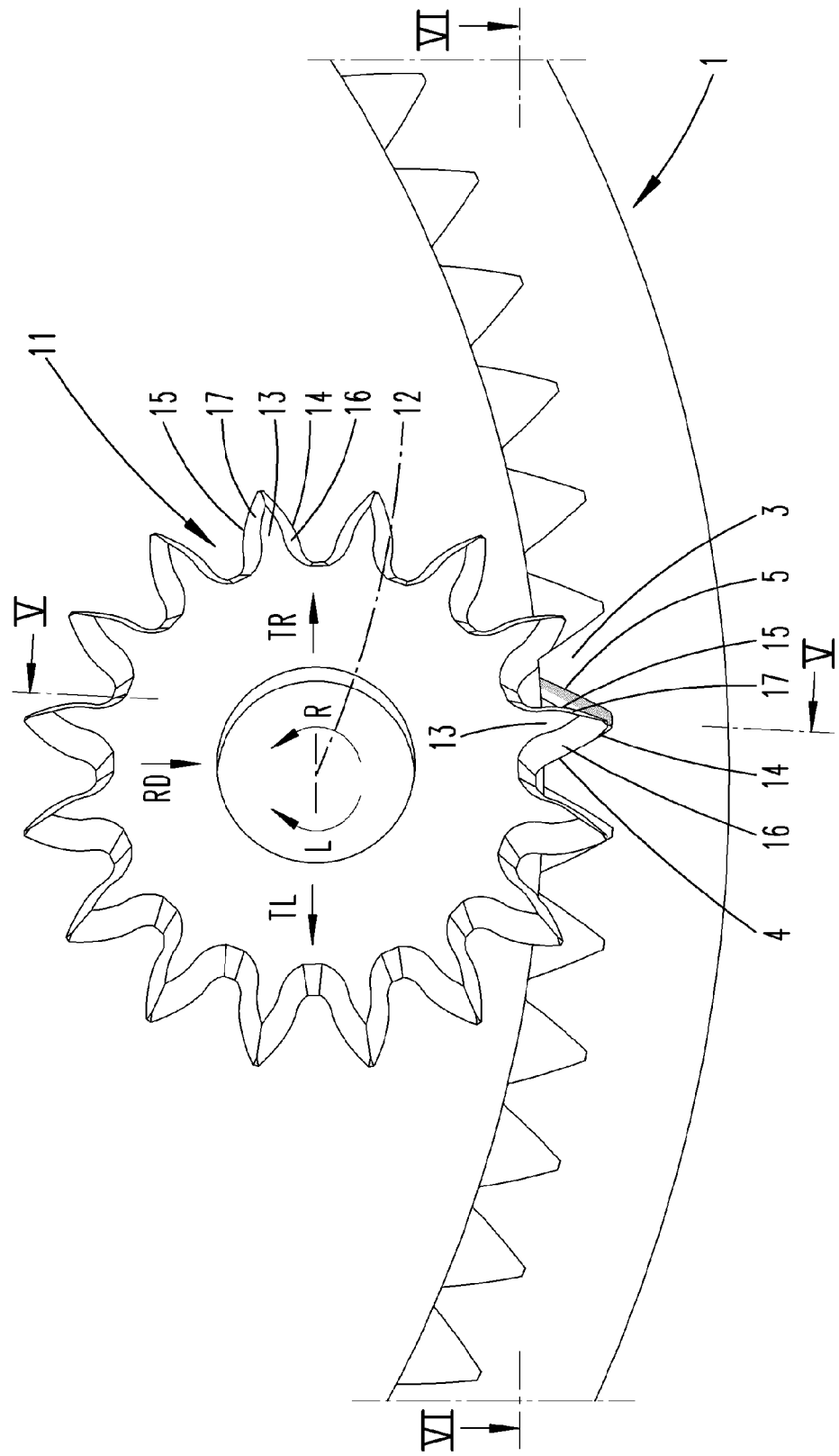
FIG. 2 shows a plan view of the front side of the gear blank 1 in the region of the tooth engagement of a cutting tooth 13 of the cutting wheel 11 into a tooth gap between tooth flanks 4, 5 of the gear blank 1.

FIG. 2 shows the situation after machining the right tooth flank 5.

For machining the left tooth flank 4 the cutting wheel 11 is brought into the position shown in FIG. 2 with respect to the gear blank 1 in which the left cutting edge 14 abuts against the left tooth flank 4. Accompanying the above-described basic feed in the direction of the direction of extension of the teeth 3, the left undercuts 6 are now incorporated in the left tooth flanks 4 wherein a differential feed in the anticlockwise direction of rotation L of the cutting wheel 11 is superposed on the basic feed so that an undercut flank 8 is incorporated into the left tooth flank until the transition 10 is reached. An exit flank 9 remains.

In addition to the arrows indicating the anticlockwise direction of rotation L and the clockwise direction of rotation R, FIG. 2 shows additional arrows which indicate the radial direction RD, a tangential direction in the anticlockwise direction of rotation TL and a tangential direction in the clockwise direction of rotation TR. In one variation of the method in which successively firstly the right tooth flanks 5 and then the left tooth flanks 4 are provided with undercuts, in each case a tangential feed in relation to the tooth engagement point of the cutting wheel 11 in the gear blank 1 is superposed on the feed in the axial direction, i.e. generally the feed in the tooth flank extension direction. The tangential feed TL or TR is implemented by a linear displacement of the tool spindle with respect to the workpiece spindle in the plane of rotation of the gear blank 1. In relation to FIG. 2 in which the plane of rotation of the gear blank 1 lies in the plane of the paper, the workpiece spindle axis 12 is either shifted continuously to the left or to the right in order to provide the left tooth flank 4 or the right tooth flank 5 with an undercut. A feed movement in the radial direction RD, i.e. transversely to the tangential displacement direction TL, TR can be superposed on this feed movement. It is also possible to vary the axis intersection angle θ during this tangential feed movement.

Finally it is possible to produce the undercuts either only by a differential feed L, R or only by a tangential feed TL, TR. However it is also possible to implement the feed by a combined differential and tangential movement.

The tool spindle axis 12 passes through the plane of rotation of the gear blank 1 which runs through the hob-peeling engagement point of the cutting edge 14, 15 in a radial line of the hob-peeling engagement point, relative to the axis of rotation of the gear blank 1.

The preceding explanations are used to explain the inventions covered overall by the application which in each case independently further develop the prior art at least by the following feature combinations, namely:

A method which is characterized in that in two consecutive machining steps the left tooth flanks 4 are each machined by a differential and/or tangential feed component in the anticlockwise direction of rotation L, TL with the left cutting edges 14 of the cutting teeth 13 and the right tooth flanks 5 are machined by a differential and/or tangential feed component in the clockwise direction of rotation R, TR with the right cutting edges 15 of the cutting teeth 13.

A method which is characterized in that either only a differential feed component in the anticlockwise direction of rotation L or in the clockwise direction of rotation R or only a left tangential feed component TL or right tangential feed component TR is superposed on the feed movement in the direction of extension of the teeth.

A method which is characterized in that for correction of distortions in the surface profile of the undercut flanks 7, 8 during feed in the tooth flank direction, the radial distance of the point of intersection of the workpiece spindle axis 2 and the tool spindle axis 12 with respect to the workpiece spindle axis 2 and/or the axis intersection angle $\theta$ is varied.

A method which is characterized in that the axis intersection angle $\theta$ is in the range between 8° and 25°, preferably in the range between 10° and 15°.

A method which is characterized in that the ratio of the cutting teeth 13 of the cutting wheel 11 to the teeth 3 of the gear blank 1 is less than a half, less than a third, less than a quarter or approximately one fifth.

A method which is characterized in that the undercuts 6, 7 in an undercut angle $\alpha$ of 2.5° to 17°, in particular of 4° to 15° to the tooth flank 4, 5 have undercut flanks 8 running tooth-inwards.

A method which is characterized in that the flank clearance angle $\epsilon$ of the cutting edges 14, 15 is at least 2° larger than the undercut angle $\alpha$ and preferably lies in a range between 6 and 17°.

A method which is characterized in that the undercuts 6 have exit flanks 9 running at an exit angle $\beta$>15° to the tooth flank 4, 5.

A method which is characterized in that the teeth 3 of the gear blank 1 run helically to the axis 2 of the gear blank 1.

A method which is characterized in that after reaching a maximum depth of penetration in the tooth flank 4, 5, the cutting wheel 11 is moved out from the toothed structure without axial feed, in particular in the radial direction so that an exit flank 9 adjoining a transition 10 is formed.

A machine tool which is characterized by a tool spindle 18 which carries a cutting wheel 11 having left and right cutting teeth 14, 15, having a workpiece spindle 19 which carries a toothed gear blank 1 provided with undercuts and having a feed device 21 at least for relative displacement of the cutting wheel 11 with respect to the gear blank 1 in the axial direction 2 of the workpiece spindle 19, wherein the tool spindle 19, the workpiece spindle 18 and the feed device 21 have electrical individual drives which can be driven according to a control program by a control device 22, wherein the control program is adapted in such a manner that for incorporating undercuts 6 in left and right tooth flanks 4, 5 of the teeth 3 of a toothed gear blank 1 by hob peeling in two consecutive machining steps, the left tooth flanks 4 are each machined by a differential and/or tangential feed component in the anticlockwise direction of rotation L, TL with the left cutting edges 14 of the cutting teeth 13, and the right tooth flanks 5 are machined by a differential and/or tangential feed component in the clockwise direction of rotation R, TR with the right cutting edges 15 of the cutting teeth 13.

All the disclosed features are (by themselves and also combined with one another) essential to the invention. The disclosure of the application herewith fully includes the disclosure content of the relevant/appended priority documents (copy of the prior application), also for the purpose of incorporating features of these documents in claims of the present application. The subclaims with their features characterize independent further developments of the prior art, in particular in order to make divisional applications on the basis of these claims.

The invention claimed is:

1. A method for incorporating undercuts in left and right tooth flanks of teeth of a toothed gear blank by hob peeling, wherein the gear blank and a cutting wheel having cutting teeth with right and left cutting edges arranged at an axis intersection angle to the gear blank are continuously rotationally driven at a fixed speed ratio, the cutting teeth engage in the tooth flanks in a manner that removes shavings and a feed has at least one movement component in the direction of extension of the teeth of the gear blank, wherein in two consecutive machining steps the left tooth flanks are each machined by a differential and/or tangential feed component in an anticlockwise direction of rotation with the left cutting edges of the cutting teeth and the right tooth flanks are machined by a differential and/or tangential feed component in a clockwise direction of rotation with the right cutting edges of the cutting teeth.

2. The method according to claim 1, wherein either only the differential feed component in the anticlockwise direction of rotation or in the clockwise direction of rotation or only the left tangential feed component or right tangential feed component is superposed on the feed movement in the direction of extension of the teeth.

3. The method according to claim 1, wherein for correction of distortions in a surface profile of undercut flanks during feed in the tooth flank direction, a radial distance of a point of intersection of a workpiece spindle axis and a tool spindle axis with respect to the workpiece spindle axis and/or the axis intersection angle is varied.

4. The method according to claim 1, wherein the axis intersection angle is in the range between 8° and 25°.

5. The method according to claim 1, wherein a ratio of the cutting teeth of the cutting wheel to the teeth of the gear blank is less than a half.

6. The method according to claim 1, wherein the undercuts in an undercut angle of 2.5° to 17° to the tooth flank have undercut flanks running tooth-inwards.

7. The method according to claim 1, wherein a flank clearance angle of the cutting edges is at least 2° larger than an undercut angle.

8. The method according to claim 1, wherein the undercuts have exit flanks running at an exit angle >15° to the tooth flank.

9. The method according to claim 1, wherein the teeth of the gear blank run helically to an axis of the gear blank.

10. The method according to claim 1, wherein after reaching a maximum depth of penetration in the tooth flank the cutting wheel is moved out from the toothed structure without axial feed, in particular in the radial direction so that an exit flank adjoining a transition is formed.

11. A machine tool having a tool spindle which carries a cutting wheel having cutting teeth with left cutting edges and right cutting edges, having a workpiece spindle which carries a toothed gear blank provided with undercuts and having a feed device at least for relative displacement of the cutting wheel with respect to the gear blank in an axial direction of the workpiece spindle, wherein the tool spindle, the workpiece spindle and the feed device have electrical individual drives which can be driven according to a control program by a control device, wherein the control program is adapted in such a manner that for incorporating undercuts in left and right tooth flanks of the teeth of a toothed gear blank by hob peeling in two consecutive machining steps, the left tooth flanks are each machined by a differential and/or tangential feed component in an anticlockwise direction of rotation with the left cutting edges of the cutting teeth and the right tooth flanks are machined by a differential and/or tangential feed component in a clockwise direction of rotation with the right cutting edges of the cutting teeth.

12. The machine tool of claim 11, wherein only the differential feed component in the anticlockwise direction of rotation or in the clockwise direction of rotation or only the left tangential feed component or right tangential feed component is superposed on a feed movement in a direction of extension of the teeth of the toothed gear blank.

13. The machine tool of claim 11, wherein for correction of distortions in a surface profile of undercut flanks during feed in a tooth flank direction, a radial distance of a point of intersection of a workpiece spindle axis and a tool spindle axis with respect to the workpiece spindle axis and/or an axis intersection angle is varied.

14. The machine tool of claim 11, wherein an axis intersection angle is in the range between 8° and 25°.

15. The machine tool of claim 11, wherein a ratio of the cutting teeth of the cutting wheel to the teeth of the gear blank is less than a half.

16. The machine tool of claim 12, wherein for correction of distortions in a surface profile of undercut flanks during feed in a tooth flank direction, a radial distance of the point of intersection of a workpiece spindle axis and a tool spindle axis with respect to the workpiece spindle axis and/or an axis intersection angle is varied.

17. The machine tool of claim 12, wherein an axis intersection angle is in the range between 8° and 25°.

18. The machine tool of claim 12, wherein a ratio of the cutting teeth of the cutting wheel to the teeth of the gear blank is less than a half.

19. The machine tool of claim 12, wherein the undercuts in an undercut angle of 2.5° to 17° to the tooth flank have undercut flanks running tooth-inwards.

20. The method according to claim 4, wherein the axis intersection angle is in the range between 10° and 15°.

21. The method according to claim 5, wherein the ratio of the cutting teeth of the cutting wheel to the teeth of the gear blank is less than a quarter.

22. The method according to claim 6, wherein the undercuts are in an undercut angle of 4° to 15° to the tooth flank.

23. The method according to claim 7, wherein the flank clearance angle of the cutting edges is between 6° and 17°.

24. The machine tool according to claim 14, wherein the axis intersection angle is in the range between 10° and 15°.

25. The machine tool according to claim 15, wherein the ratio of the cutting teeth of the cutting wheel to the teeth of the gear blank is less than a quarter.

26. The machine tool of claim 17, wherein the axis intersection angle is in the range between 10° and 15°.

27. The machine tool of claim 18, wherein the ratio of the cutting teeth of the cutting wheel to the teeth of the gear blank is less than a quarter.

28. The machine tool of claim 19, wherein the undercuts are in an undercut angle of 4° to 15° to the tooth flank.

* * * * *